(12) United States Patent
Turitz

(10) Patent No.: US 10,898,397 B2
(45) Date of Patent: Jan. 26, 2021

(54) SYSTEM FOR MEASURING DISTANCES TRAVELED BY A MOBILITY ASSISTANCE DEVICE

(71) Applicant: Jeffrey Turitz, Midland Park, NJ (US)

(72) Inventor: Jeffrey Turitz, Midland Park, NJ (US)

( * ) Notice: Subject to any disclaimer, the term of this patent is extended or adjusted under 35 U.S.C. 154(b) by 53 days.

(21) Appl. No.: 16/011,858

(22) Filed: Jun. 19, 2018

(65) Prior Publication Data

US 2018/0296407 A1 Oct. 18, 2018

Related U.S. Application Data

(63) Continuation-in-part of application No. 15/421,717, filed on Feb. 1, 2017, now Pat. No. 10,267,648.

(Continued)

(51) Int. Cl.
*A61G 5/10* (2006.01)
*G01C 22/00* (2006.01)
(Continued)

(52) U.S. Cl.
CPC ............... *A61G 5/10* (2013.01); *A61G 5/022* (2013.01); *A61H 3/04* (2013.01); *G01C 22/00* (2013.01);
(Continued)

(58) Field of Classification Search
CPC ...... A61G 5/10; A61G 5/022; A61G 2203/40; A61H 3/04; A61H 2201/5064; A61H 2003/046; A61H 2201/501; A61H 2201/5043; A61H 2201/5097; A61H 2201/5007; A61H 2201/5092; A61H 2201/0184; G01S 19/42; G08B 23/00; G01C 22/00
See application file for complete search history.

(56) References Cited

U.S. PATENT DOCUMENTS 745,726 A 12/1903 Hathaway
2,742,229 A 4/1956 Hacking
(Continued)

FOREIGN PATENT DOCUMENTS

FR 2226647 11/1974
GB 1593282 A 7/1981
(Continued)

OTHER PUBLICATIONS

European Search Report dated May 30, 2017 in corresponding European application No. EP17154639.
(Continued)

*Primary Examiner* — Tony Ko
(74) *Attorney, Agent, or Firm* — Gearhart Law LLC

(57) ABSTRACT

A system may have a mobile device having at least two wheels and a distance measuring device configured to be removably attached to a frame of the mobile device, which can be a mobility assistance device, such as a walker and a wheelchair. The distance measuring device may have at least a sensing mechanism, an accumulator, and a display that are in communication with one another, with the sensing mechanism configured to monitor rotation of the at least one of the at least two wheels of the mobile device and the accumulator configured to determine the distance traveled by the mobile device based on this rotation and output the distance result on the display.

13 Claims, 10 Drawing Sheets

Related U.S. Application Data

(60) Provisional application No. 62/290,995, filed on Feb. 4, 2016.

(51) Int. Cl.
    *G08B 23/00*     (2006.01)
    *G01S 19/42*     (2010.01)
    *A61G 5/02*     (2006.01)
    *A61H 3/04*     (2006.01)

(52) U.S. Cl.
    CPC .............. *G01S 19/42* (2013.01); *G08B 23/00* (2013.01); *A61G 2203/40* (2013.01); *A61H 2003/046* (2013.01); *A61H 2201/0184* (2013.01); *A61H 2201/501* (2013.01); *A61H 2201/5007* (2013.01); *A61H 2201/5043* (2013.01); *A61H 2201/5064* (2013.01); *A61H 2201/5092* (2013.01); *A61H 2201/5097* (2013.01)

(56) References Cited

U.S. PATENT DOCUMENTS

| | | |
|---|---|---|
| 3,202,353 A | 8/1965 | Nowak et al. |
| 3,458,128 A | 7/1969 | Tillman |
| 3,629,557 A | 12/1971 | Lareau |
| 3,643,860 A | 2/1972 | Goetz et al. |
| 4,308,665 A | 1/1982 | Losch |
| 4,546,650 A | 10/1985 | Cameron |
| 4,807,265 A | 2/1989 | Swanson |
| 4,860,585 A | 8/1989 | Tuyn et al. |
| 4,989,342 A | 2/1991 | Nosek |
| 5,249,013 A | 11/1993 | Demura et al. |
| 5,311,880 A | 5/1994 | Lancaster et al. |
| 5,524,034 A | 6/1996 | Srygley et al. |
| 5,600,113 A | 2/1997 | Ewers |
| 5,767,394 A | 6/1998 | Butts et al. |
| 5,799,258 A | 8/1998 | Fidanza et al. |
| 5,893,817 A | 4/1999 | Morgan |
| 6,011,827 A | 1/2000 | Kyrtsos |
| 6,357,655 B1 | 3/2002 | Ralli |
| 6,366,869 B1 | 4/2002 | Germain |
| 6,450,922 B1 | 9/2002 | Henderson et al. |
| 6,527,673 B1 | 3/2003 | Chen |
| 7,044,361 B2 | 5/2006 | March |
| 7,812,713 B2 | 10/2010 | Montagnon et al. |
| 7,826,983 B2 | 11/2010 | Alwan et al. |
| 8,155,918 B2 | 4/2012 | Reed et al. |
| 9,022,397 B1 | 5/2015 | Prettyman |
| 9,062,986 B1 * | 6/2015 | Ellis ..................... G01C 21/36 |
| 2002/0167140 A1 | 11/2002 | Pike et al. |
| 2004/0016141 A1 | 1/2004 | Hofstee |
| 2007/0000325 A1 | 1/2007 | Weber et al. |
| 2013/0117857 A1 * | 5/2013 | Zimmermann ......... G06F 21/62 726/27 |

FOREIGN PATENT DOCUMENTS

| | | |
|---|---|---|
| GB | 2069698 | 8/1981 |
| GB | 2125349 | 3/1984 |
| GB | 2242527 | 10/1991 |
| GB | 2283820 | 5/1995 |
| GB | 2285864 | 7/1995 |
| GB | 2286046 | 8/1995 |
| JP | 2002345908 | 12/2002 |
| JP | 2004306926 | 11/2004 |
| WO | 8702261 | 4/1987 |

OTHER PUBLICATIONS

Steve Dilts, "10 Tips for Encoder Measuring Wheel Applications", Encoder Blog, Mar. 21, 2013, pp. 1-10.

Encoder Products, "Product Spotlight—Model TR1 Tru-Trac(TM) Measuring Wheel Encoder Solutions", YouTube, www.youtube.com/watch?v=2i8dwPmUhQw, Nov. 6, 2012.

\* cited by examiner

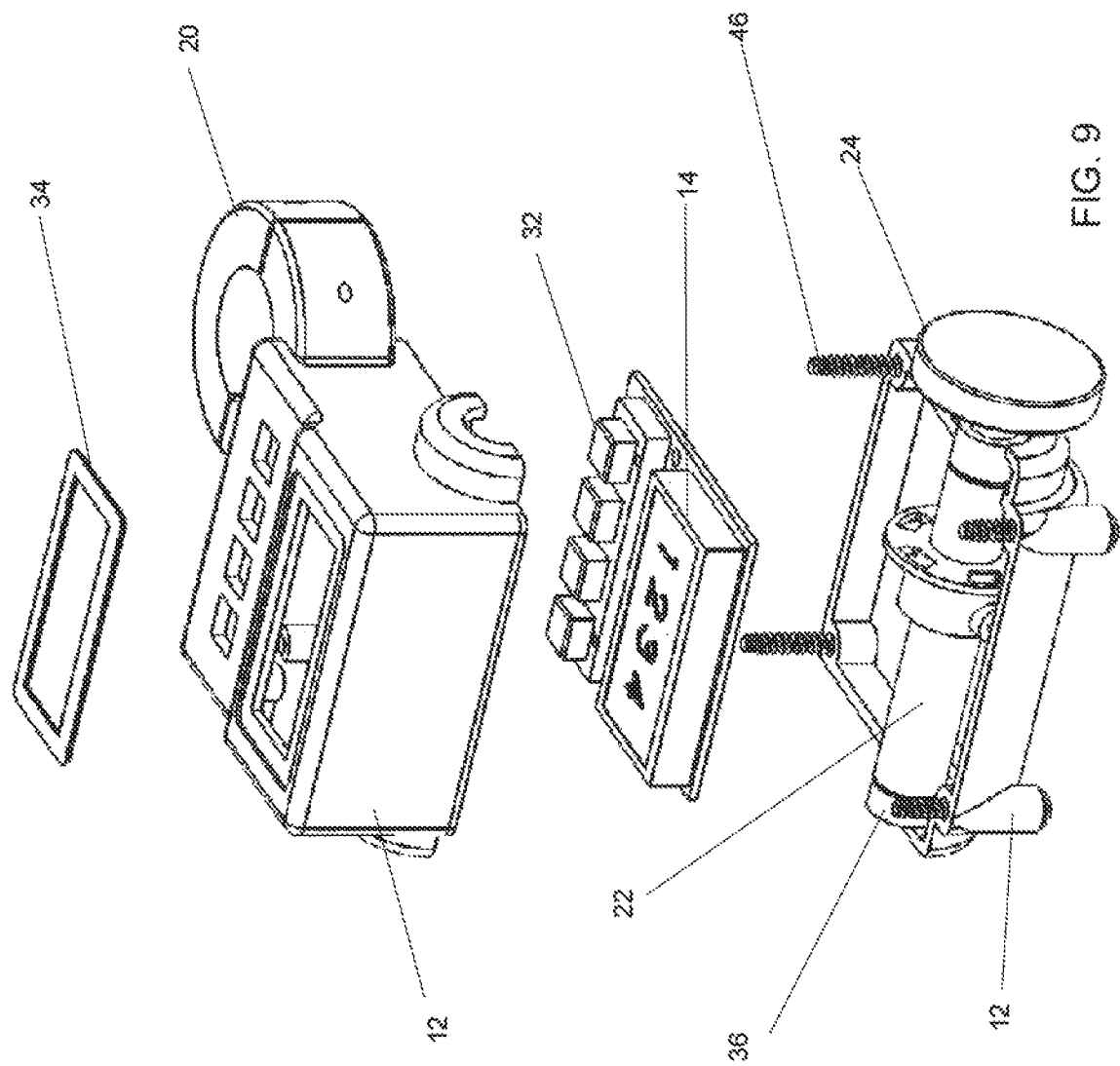

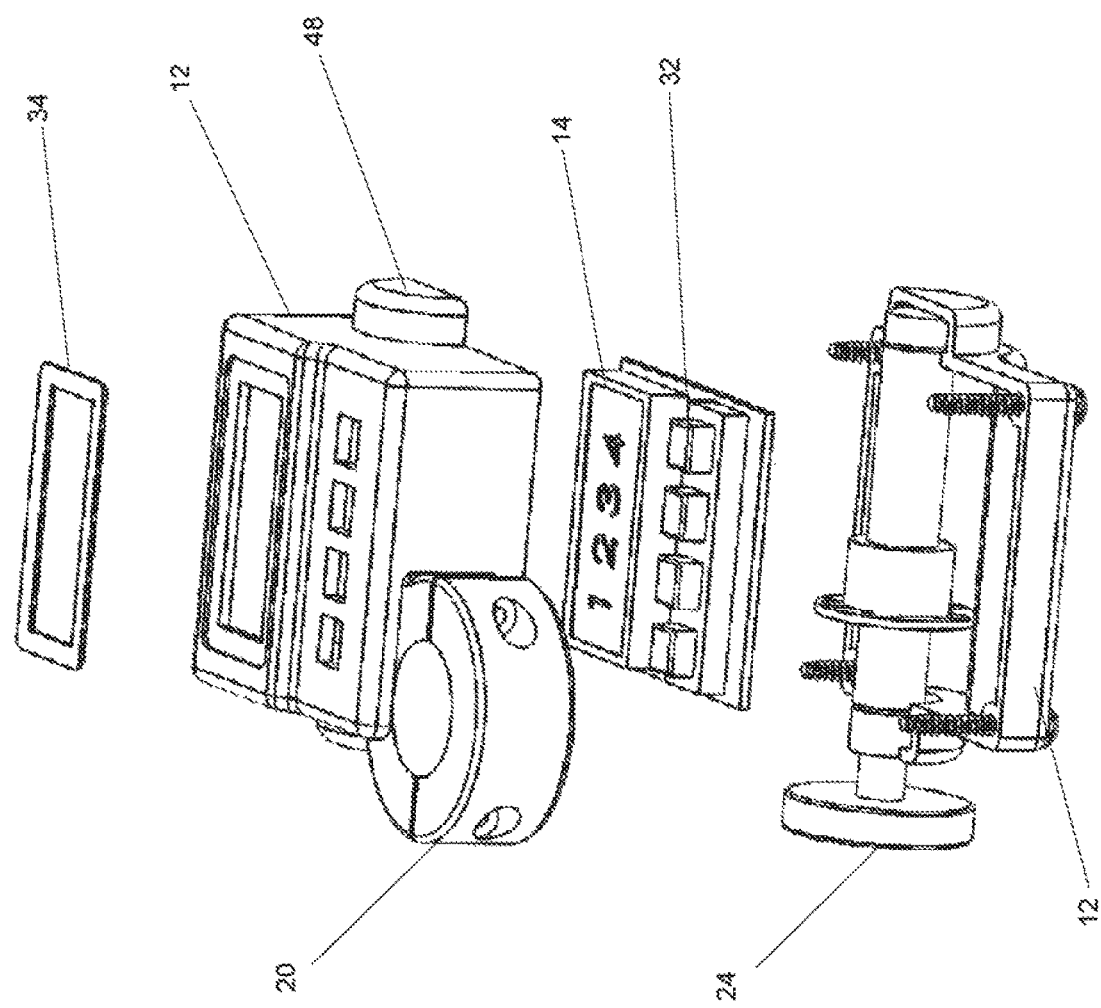

SYSTEM FOR MEASURING DISTANCES TRAVELED BY A MOBILITY ASSISTANCE DEVICE

CLAIM OF PRIORITY

This application claims priority to U.S. patent application Ser. No. 15/421,717, filed on Feb. 1, 2017, which claims priority to U.S. Application 62/290,995, filed on Feb. 4, 2016, the contents of which are herein fully incorporated by reference in their entirety.

FIELD OF THE EMBODIMENTS

The field of the embodiments of the present invention relates to a distance measuring system for mobility assistance devices and more particularly pertains to a resettable distance measuring meter to a user of a walker or a wheelchair.

BACKGROUND OF THE EMBODIMENTS

One of the important goals of physical therapy/rehabilitation is to restore a patient's hampered abilities (due to an injury or older age) to the highest possible level which usually requires objectively assessing the patient improvement during the course of the physical therapy/rehabilitation. Such rehabilitation generally requires certain actions are taken and met to steadily maintain or increase one's physical attributes. However, the evaluation of a patient during the term of treatment or analysis of the patient has been somewhat unquantified with the use of certain subjective criteria for determination of patient status. Therefore, an objective method and associated devices for making quantifiable determinations of patient improvement is needed for the applications of mobility assistance devices in physical therapy/rehabilitation that permits the collection of reproducible and objective data on patient status and improvement over a course of therapy, thus providing valuable information to the patient and therapist.

Examples of related art are described below:

U.S. Pat. No. 5,311,880 pertains to a walker equipped with detectors for measuring various loads and torques placed thereon by a user including right side and left side loads as well as torque loads on the handles of the walker and having time and distance detectors to allow the ambulation status of a user to be progressively monitored by medical personnel. The system is rather complex and not straight forward to use.

U.S. Pat. No. 7,044,361 pertains to a walker distance measuring device comprising a wheel assembly, a measuring assembly and a display. The wheel assembly is capable of attachment to a walker, and includes a support and a wheel. The measuring assembly comprises a sensor having a trigger associated with one of the support and the wheel and a pickup associated with the other of the support and the wheel. The processor is electronically coupled with the sensor. The processor is capable of interpreting the information received from the sensor. The display is associated with the processor for displaying results computed from the processor. Again, the system therein, while sophisticated, is not straight forward to use.

In this respect, there exists a continuing need for an improved yet simple system which can be used as a resettable distance measuring meter for use with mobility assistance devices, such as a walker or a wheelchair. In this regard, the present invention substantially fulfills this need, as the system, according to the present invention and its embodiments, measures distances traveled by mobility assistance devices. The present system substantially departs from and is superior to the conventional concepts and designs and is intended to be structurally different as a result in some aspects as will be discussed in details below.

SUMMARY OF THE EMBODIMENTS

The general purpose of the present invention, which will be described subsequently in greater details is to provide a new and improved distance measuring system for mobility assistance devices.

The present invention and its embodiments comprise a distance measuring system associated with a mobility assistance device, such as a walker and/or wheelchair. The distance measuring system comprises a wheel of mobility assistance device and a wheel sensor unit with a readout window in a housing.

In another embodiment there is a system having a mobility device having at least two wheels; a distance measuring device configured to be removably attached to a frame of the mobility device and monitor rotation of at least one of the at least two wheels of the mobility device, wherein the distance measuring device comprises at least a sensing mechanism, a measuring mechanism, a mechanism configured to determine a location of a user, and a display in operable communication with one another, with the sensing mechanism configured to monitor rotation of the at least one of the at least two wheels of the mobility device.

In yet another embodiment there is a distance measuring device configured to be removably attached to a frame of a mobility device, the distance measuring device comprising: a sensing mechanism, a measuring mechanism, a mechanism configured to determine a location of a user, and a display that are in communication with one another, wherein the sensing mechanism is configured to monitor rotation of the at least one of at least two wheels of the mobility device.

In yet another embodiment, the distance measuring system may be configured as an attachment onto, or as a replacement part for, one of the wheels of mobility assistance device. In another one such embodiment, the output of distance measuring system is displayed by way of mechanical read-out. In yet another embodiment, the display comprises an optional digital read-out by a separate digital display unit.

In one embodiment, the present invention provides for a mobility measuring system having a mobility assistance device, the mobility assistance device having at least two wheels; a distance measuring unit configured to be removably coupled to a frame of the mobility assistance device and monitor one of the at least two wheels of the mobility assistance device by sensing and counting a number of revolutions of assistance device wheel, accumulating the number of revolutions for the determination and output of the distance traveled by assistance device mobility assistance device, wherein the distance measuring unit comprises at least a sensing mechanism, an accumulator and a display, with the sensing mechanism engaging, either directly or indirectly, the one of at least two wheels of the mobility assistance device, wherein the display, accumulator and the sensing mechanism are functionally coupled in a series to one another, and wherein rotation of the one wheel of the mobility assistance device causes a change in an output of the display.

It is an object of the present invention to provide a system for mobility assistance devices capable of providing objective quantification of patient performance during rehabilitation as well as to provide indication of proprioception status of injured areas.

It is an object of the present invention to provide a system for mobility assistance devices, wherein the mechanism configured to determine the location of the user is a GPS-enabled mechanism.

It is an object of the present invention to provide a system for mobility assistance devices, wherein the distance measuring device further includes at least one button configured to send an alarm message to one or more secondary devices.

It is an object of the present invention to provide a system for mobility assistance devices, wherein the distance measuring device further includes one or more wireless communication devices configured to wirelessly send data to one or more secondary devices.

It is another object of the invention to provide documentation of patient response to therapy for evaluation by physicians and physical therapists and to provide a source of objective feedback to a patient as a means of demonstrating patient success in a course of therapy during rehabilitation and to encourage the patient to sustain the course of therapy.

Other objects and advantages of this invention will become apparent from the following description taken in connection with the accompanying drawings, wherein is set forth by way of illustration and example, an embodiment of this invention.

BRIEF DESCRIPTION OF THE DRAWINGS

FIG. 9 is a second exploded perspective view of another embodiment of the present invention.

FIG. 10 is an exploded front view of another embodiment of the present invention.

DESCRIPTION OF THE PREFERRED EMBODIMENTS

Figure 1:
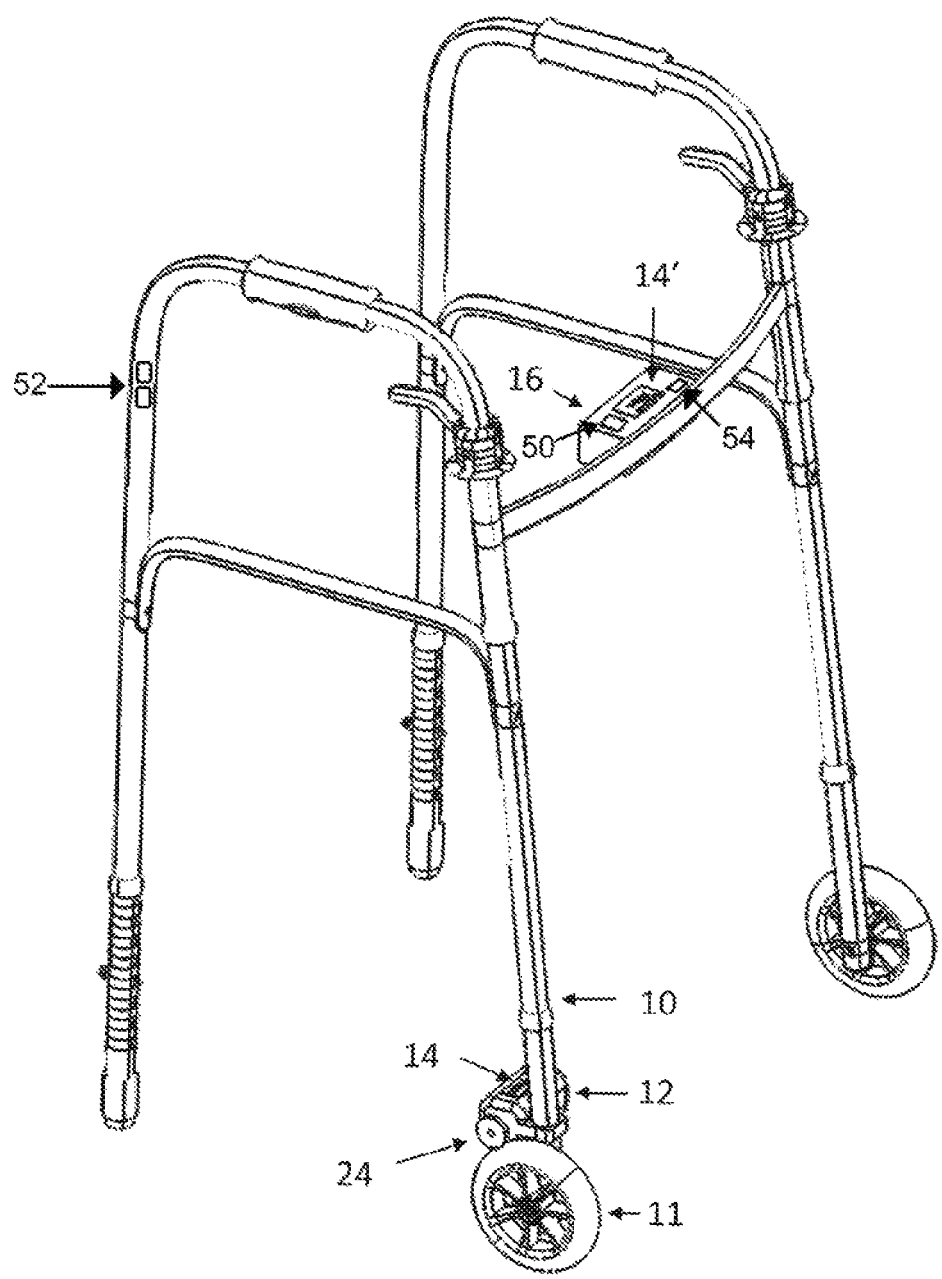
FIG. 1 shows a perspective view of an embodiment of the invention associated with a walker as the mobility assistance device.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring now to the drawings, and to FIG. 1 in particular, distance measuring system for a mobility assistance device (or more specifically, a walker, a wheelchair, etc.) comprises tubular frame 10 and wheel 11 of a mobility assistance device, wheel sensor unit 12 with a readout window 14 contained in a housing and its sensing wheel 24. An optional digital display unit 16 is also contemplated. According to this embodiment, this distance measuring system may be configured as an attachment onto, or as a replacement part for, one of the wheels of a walker, or alternatively, for other mobility assistance devices used in the medical and rehabilitation field, such as one of the front wheels of a wheelchair. While in the drawing (FIG. 1), the attachment via a fastener is on the right wheel of a walker, the wheel sensor unit 12 is configured such that it can be similarly removably attached to the left wheel as well and may further be attached to the forward or rear wheels (if present).

According to an embodiment, the digital display unit 16 further includes a Global Positioning Satellite (GPS)-enabled device 50. According to an embodiment, the GPS-enable device 50 is configured to determine a geographic location of the user. According to an embodiment, the geographic location of the user is sent to a secondary location, enabling a third party to determine the geographic location of the user. It is noted, however, that the GPS-enabled device 50 may not be coupled to the digital display unit and may be positioned at any suitable location on the mobility assistance device. It is noted, however, that any device 50 capable of determining a location of the user may be used, while maintaining the spirit of the present invention.

According to an embodiment, the mobility assistance device further includes one or more buttons 52 configured to enable the user to send an alarm to one or more third parties, enabling the user to request assistance. According to an embodiment, the alarm includes a geographic location of the user obtained using the GPS-enabled device. It is noted that the one or more buttons 52 may be positioned at any suitable location on the mobility assistance device. According to an embodiment, the at least one button functions similar to a medical alert device.

According to an embodiment, the digital display unit 16 further includes a wireless transceiver 54. According to an embodiment, the wireless transceiver 54 is configured to send and/or receive information to and/or from one or more remote devices. According to an embodiment, the information may include the geographic location of the user, the alarm, and/or any other relevant information.

Figure 2:
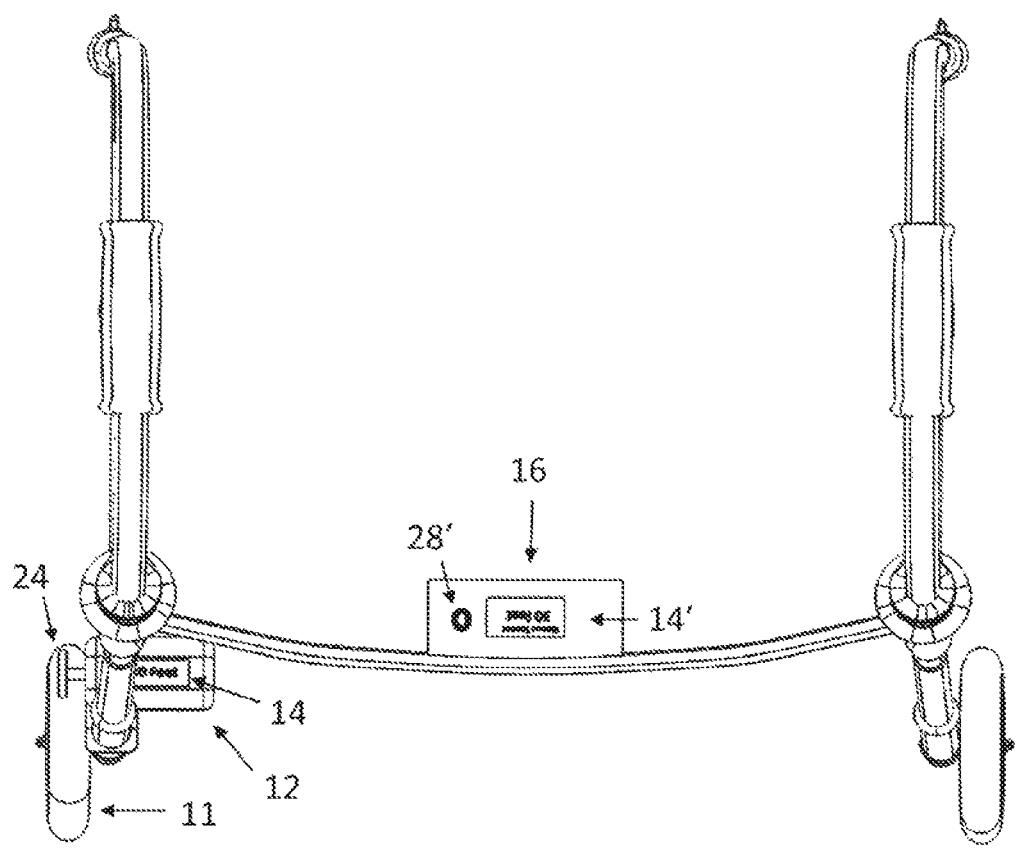
FIG. 2 shows a top view of an embodiment of the present invention.

In the embodiment as shown in FIG. 2, the relationship between the wheel sensor unit housing 12 with its read-out 14 and sensing wheel 24 as well as the walker wheel 11 being monitored is more clearly shown. Also more clearly shown is the attachment of the optional display 16 with its read-out 14' and reset button 28' on the top horizontal frame of the walker. According to an embodiment, the distance measuring system is powered on upon the sensing wheel 24 detecting that the distance measuring system is in motion (e.g., upon the rotation of the wheels 11).

Figure 3:
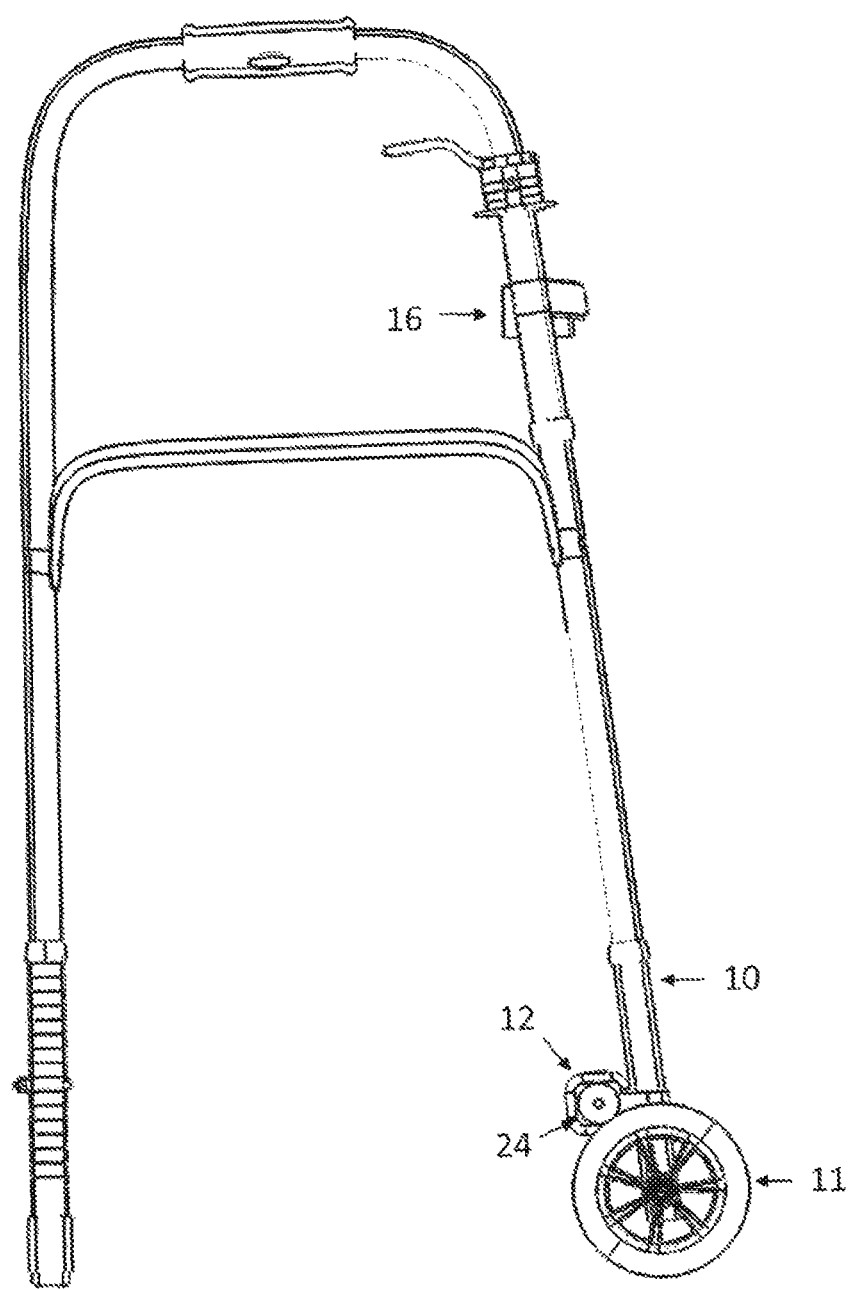
FIG. 3 shows a right side view of an embodiment of the present invention.

In the embodiment as shown in FIG. 3, the relationship between the wheel sensor unit housing 12 with its sensing wheel 24 and the walker wheel 11 being monitored is more clearly shown.

Figure 4:
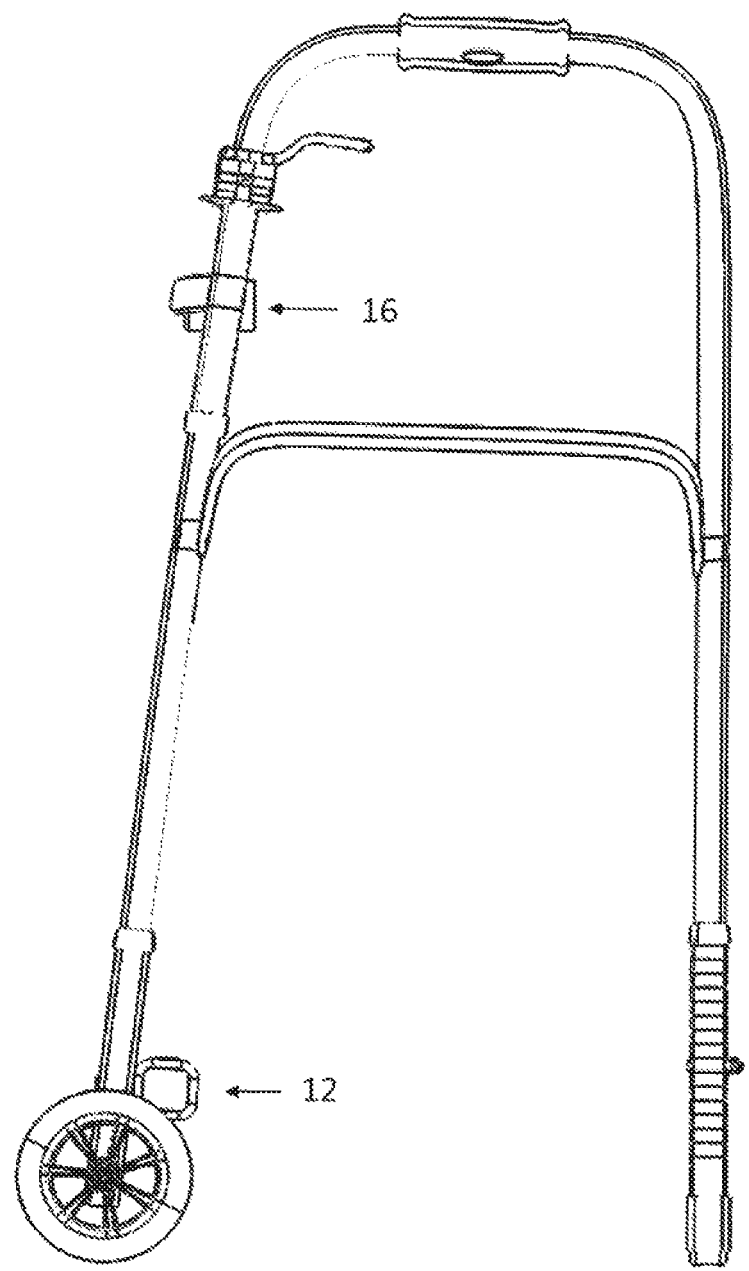
FIG. 4 shows a left side view of an embodiment of the present invention

In the embodiment as shown in FIG. 4, the back side of the wheel sensor unit housing 12 is more clearly shown.

Figure 5:
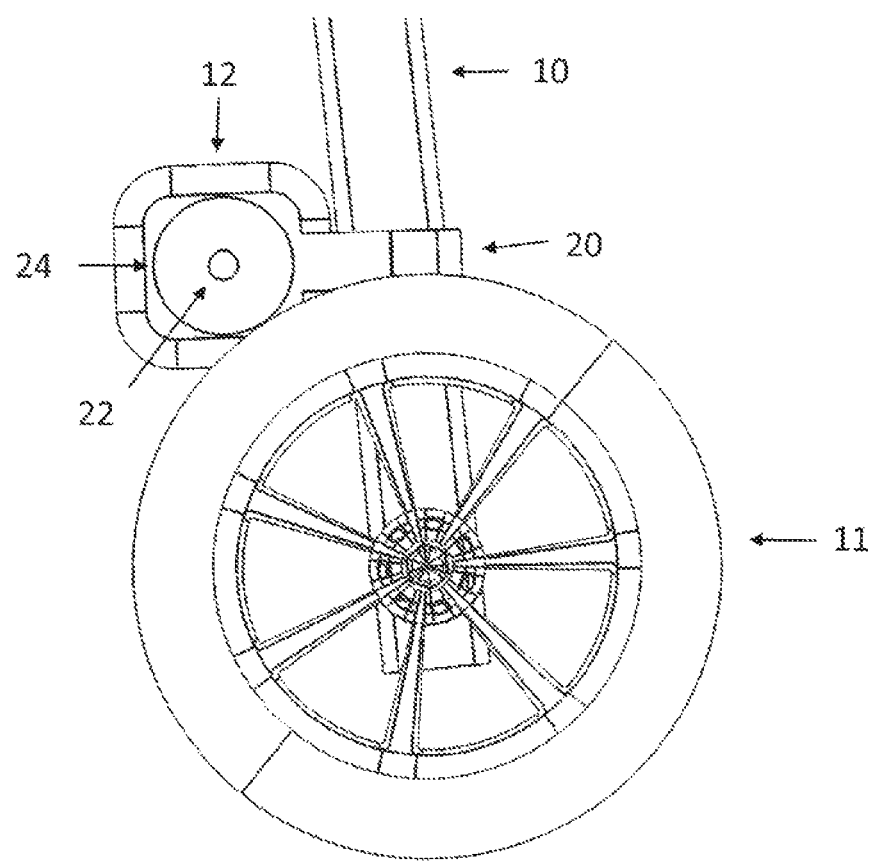
FIG. 5 shows a right side view of a section of an embodiment of the present invention.

In the embodiment as shown in FIG. 5, the lower section of the walker near the wheel 11 being monitored is more clearly shown, as well as the relationship between the sensing wheel 24 of the wheel sensor unit 12, which is mounted on wheel axle 22, and the walker wheel 11 being monitored.

Figure 6:
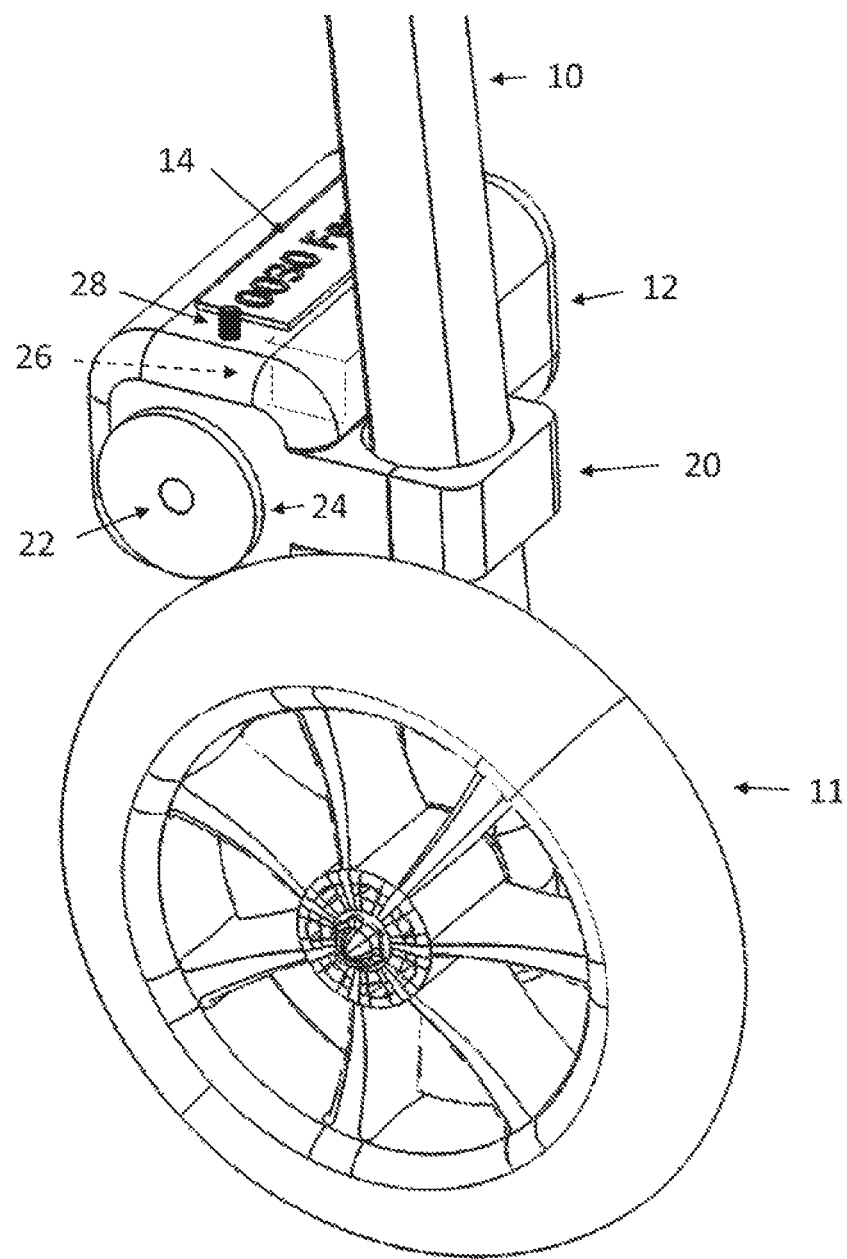
FIG. 6 shows a perspective side view of a section of an embodiment of the present invention.

In the embodiment as shown in FIG. 6, the same section of the walker shown in FIG. 5 is shown in a perspective view, as well as the relationship between the wheel sensor unit housing 12 (with its read-out 14, reset button 28, internal accumulator 26 and sensing wheel 24 mounted on axle 22) and the walker wheel 11 being monitored. Also more clearly shown is the attachment of the wheel sensor unit housing 12 through an attachment fastener 20 onto the tubular member 10 on the front frame of a walker and/or the front wheel frame of a wheelchair of the walker. The removable attachment fastener may be of the open claw shape for attaching the wheel sensor unit to a tubular front member of the walker/wheelchair so that it can also be easily detached and/or adjusted. Of course other attachment means, and attachment assemblies are contemplated for use, including, but not limited to clamps, collars, adhesives, among others.

Figure 7:
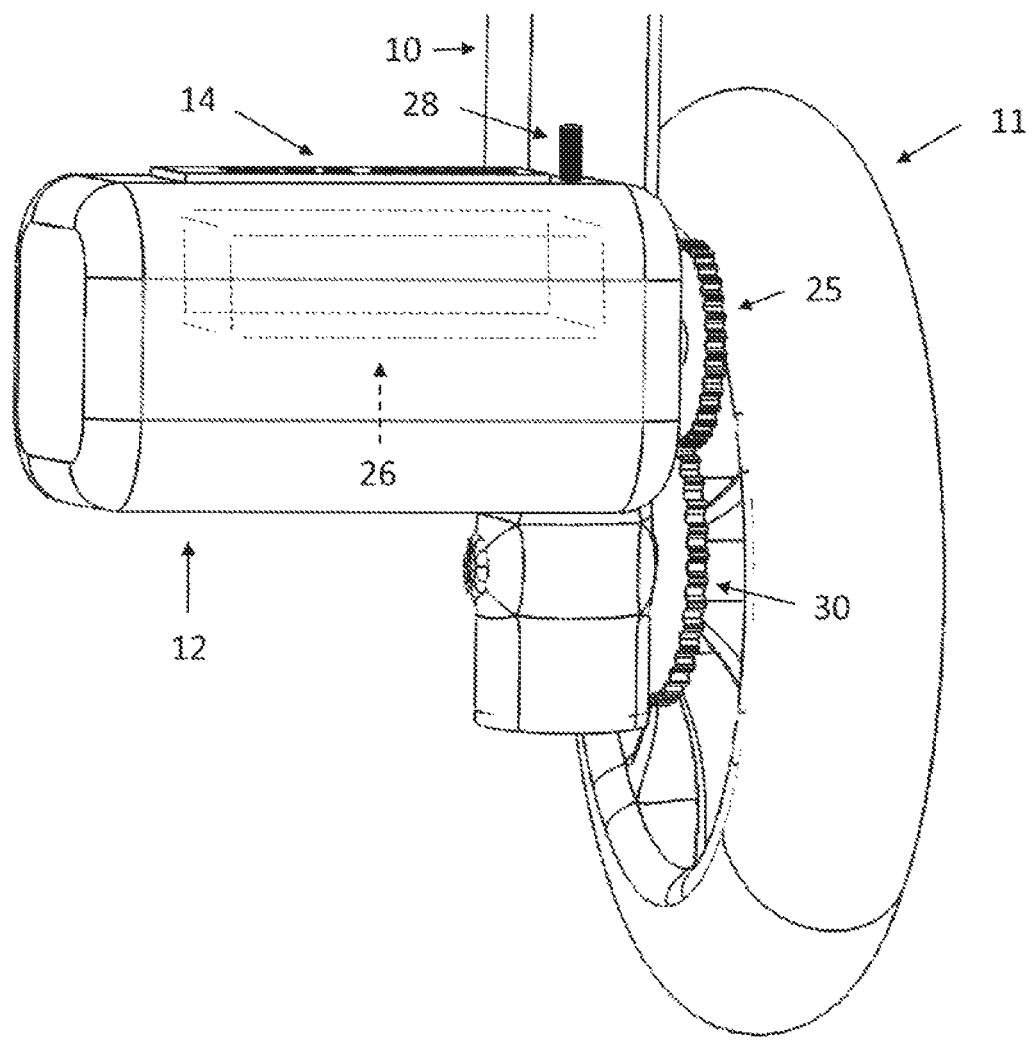
FIG. 7 shows a perspective rear view of a section of an embodiment of the present invention.

In the embodiment as shown in FIG. 7, the rear side of a similar section (as shown in FIG. 6) of another embodiment of the invention is shown in a perspective view, as well as the relationship between the wheel sensor unit housing 12 (with its read-out 14, reset button 28 and internal accumulator 26) and sensing gear wheel 25 engaging a matching gear 30 mounted on the same axle of the walker wheel 11 being monitored. According to an embodiment, the distance measuring system is powered on upon the sensing gear wheel 25 detecting that the distance measuring system is in motion (e.g., upon the rotation of the wheels 11).

In one embodiment of the present invention, axle 22 extends from one end of wheel sensor unit 12 and onto the axle, the sensing wheel 24 is attached and is permitted to rotate about axle 22. The outer perimeter of the sensing wheel 24 is generally made of a suitable material comprising plastic and rubber, which is compatible to be in frictionable engagement with the outer perimeter surface material of the wheel 11 of the walker/wheelchair. It is contemplated that the sensing wheel 24 comprises a predetermined circumference, such as about 0.5 inches to about 6 inches in the preferred embodiment and more preferably may be about 1 inch to about 2 inches. Of course, any number of different sizes and configurations are contemplated as well.

More specifically according to a preferred embodiment of the present invention, the wheel sensor unit 12 may comprise a mechanical sensing wheel 24, the outer perimeter surface of which is in constant and direct contact with the outer perimeter surface of the wheel 11 of the mobility assistance device being monitored. The mechanical sensing wheel 24 is thus made to rotate, by friction between the two outer perimeter surfaces, such that to count a number of revolutions of wheel 11 of the mobility assistance device. Inside the wheel sensor unit housing 12 is a mechanical accumulator 26 (see internal dotted line object in FIG. 6 and FIG. 7), which communicates with the mechanical sensing wheel 24 and which comprises a series of gear mechanisms configured to determine a distance traveled by of said mobility assistance device relative to the number of revolutions of the sensing wheel, and a display/readout window 14 that also communicates with the accumulator 26 for informing the user of the distance traveled.

The accumulator comprises a series of gear wheels wherein its primary gear is in direct communication with the mechanical sensing wheel and each ten revolutions of this primary gear cause one revolution of a secondary gear and, in turn, each ten revolutions of the secondary gear cause one revolutions of a tertiary gear.

The display comprises a plurality of rotating cylinders which are each rotatably mounted relative to the housing, each of the cylinders including the digits zero (0) through nine (9) printed thereon, with each of the thumb-wheels being in mechanical communication with one of the rotating cylinders, the rotating cylinders being mechanically coupled to the mechanical accumulator such that the cylinders rotate in accordance with a negative of a distance traveled by said mobility assistance device determined by the accumulator.

It is also contemplated that there can optionally be a manual distance input/reset button 28 in the wheel sensor unit housing 12 that communicates with the mechanical accumulator 26 and display for permitting a user to input (or to zero out) a distance into the read-out.

It is further contemplated in another embodiment that the sensing wheel of the mechanical sensor unit comprises a gear wheel 25 (see FIG. 7) having either a direct engagement, or an engagement through a gear belt, with a matching gear wheel 30 on the same axle of the mobility assistance device wheel 11 being monitored such that the sensing wheel is driven by the wheel of the walker/wheelchair through the gear set teeth or through the gear belt.

Figure 8:
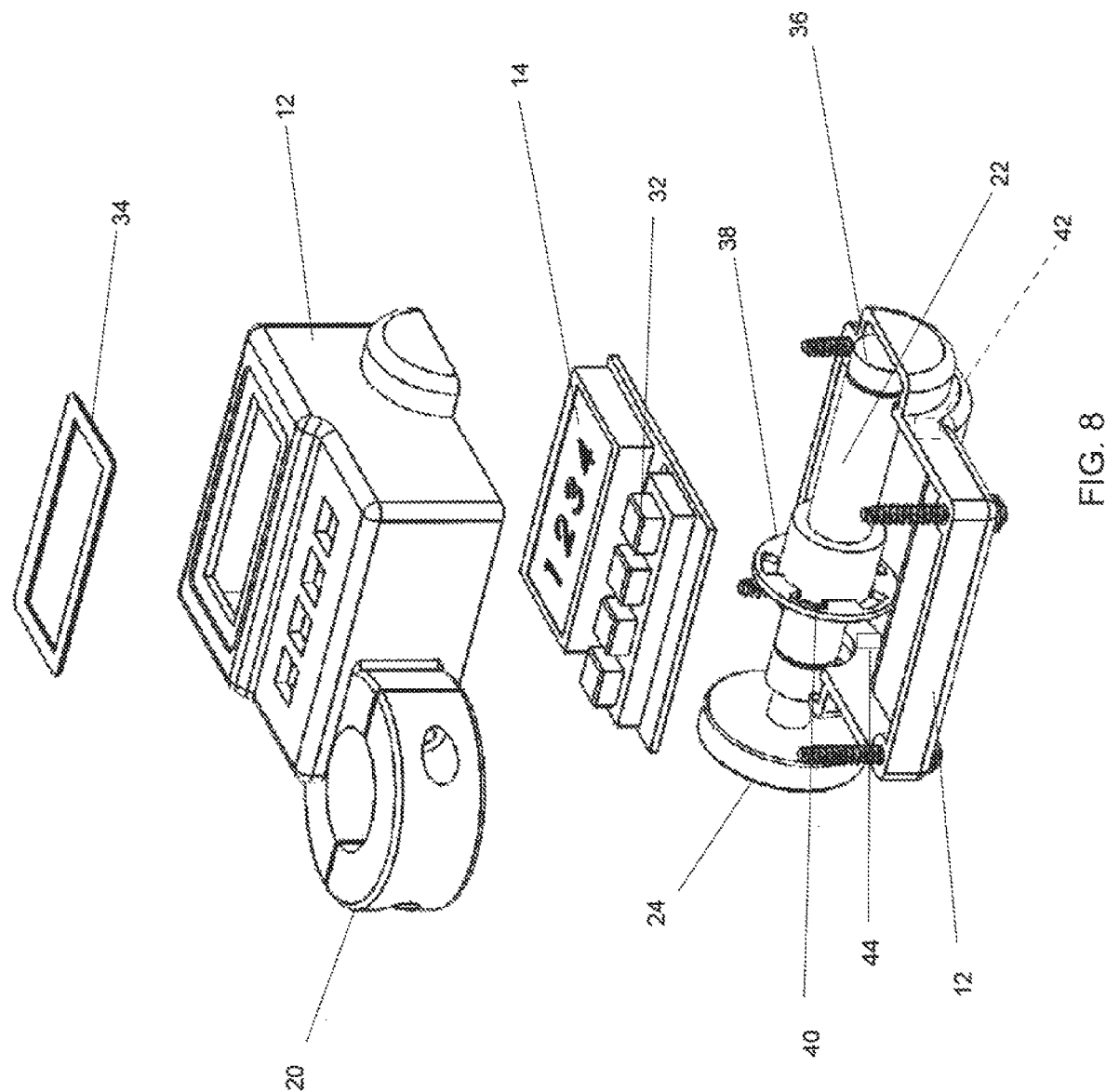
FIG. 8 is an exploded perspective view of another embodiment of the present invention.

Referring now to FIGS. 8-10, there is another embodiment of the present invention. Shown here are at least a display cover 34, housing 12, fastener 20, display 14, depressible buttons 32, wheel 24, optical wheel 38, notches 40, support wheel 36, light emitting device 44, light sensor, 42, axle 22, fastening mechanism 46, and housing support 48.

In such an embodiment, a digital display 14 is housed in the housing 12. A display cover 34 may optionally cover the digital display 14 to protect the digital display 14 from damage. Depressible buttons 32 allow a user to interact with the digital display 14. The depressible buttons 32 may allow one to change the format of the digital display 14, the distance measured (feet, meters, etc.), revolutions per minute, distance covered over time, and the like. In some embodiments, multiple readouts are capable of being displayed simultaneously. Each depressible button 32 may have its own function or combinations of buttons may be used to achieve a desired function.

The sensing mechanism may comprise primarily the sensing wheel or wheel 24, axle 22, optical wheel 38, notches 40 of the optical wheel 38, support wheel 36, light emitting device 44, and light sensor 42.

In practice, the wheel 24 is turned by the wheel of the mobility device as shown in FIGS. 1-7. As the wheel 24 turns, rotational movement of the wheel 24 translates into rotational movement of the axle 22. The optical wheel 38 is mounted on the axle 22 and rotates along with the axle 22. The notches 40 of the optical wheel 38 are spaced and positioned such that light emitting from the light emitting device 44 is intermittently blocked by the optical wheel 38 as the optical wheel 38 rotates. When a notch 40 is aligned, even temporarily, as the optical wheel 38 rotates, light is allowed to pass through the notch 40 where it is received by the light sensor 42. The light sensor 42 is operably coupled to a processor and a memory such that the light received by the light sensor may be translated and stored into values to be displayed by the digital display 14.

For example, the notches 40 may be arranged such that each time a notch 40 allows light to pass through and reach the light sensor 42 corresponds to a distance traveled of 2 inches. Thus, every light times light is received by the light sensor 42, the wheel 24 has turned a total distance of one foot. The processor and memory will need to be programmed for a particular wheel size and in some instances allow for differing wheels to be installed onto the device as needed. When a new wheel is installed, the user may receive a prompt to enter the size of the wheel, via the digital display 14, such that the correct distances are calculated.

To prevent movement of the wheel 24, there is a support wheel 36 contained with a housing support 48. The support wheel 36 may or may not turn independently of the axle 22, but is configured to reside in the housing support 48 in such a way that movement of the axle 22 and wheel 24 is prevented. For example, if the axle 22 remained with an unfixed point or end opposite the wheel 24, pressure placed upon the wheel 24 may cause the axle 22 to become unaligned with the wheel 24. This may cause the wheel 24 to improperly read the distance traveled or may impede the rotation of the optical wheel 38. Thus, by fixing the opposing end of the axle via the support wheel 38 snugly (but freely rotatable) within the support housing 48 any such instance of the above is prevented. The housing 12 may further be held together via fastening mechanism 46 such as screws or pins.

Such an embodiment may communicate with a secondary module such as an electronic device (tablet computer, smart phone, etc.) to provide a real time readout to a user or a remote party. In yet another embodiments, the digital output can be wirelessly transmitted to the through various means.

In some embodiments, the digital sensor may comprise a magnetic sensor and is mountable to a portion of the frame of said mobility assistance device so as to be positioned proximal to the wheel being monitored. To this wheel being monitored, is mounted a wheel magnet, which operates to trigger the magnetic sensor each time the wheel magnet passes the magnetic sensor. The electronic signal generated by the magnetic sensor is then sent to a digital accumulator, which comprises a processor electronically coupled with the digital/magnetic sensor, and the processor is configured for interpreting the information received from the digital sensor and output a digital signal to a digital display, which typically comprises a LCD display.

Furthermore, the aforementioned digital accumulator can comprise memory associated with the processor, wherein the memory is configured for storing data pertaining to the travel of said mobility assistance device, and the data stored in the memory can be retrieved in real time or subsequently and outputted to the digital display or another device for further processing.

Although this invention has been described with a certain degree of particularity, it is to be understood that the present disclosure has been made only by way of illustration and that numerous changes in the details of construction and arrangement of parts may be resorted to without departing from the spirit and the scope of the invention.

I claim:

1. A system comprising:
a mobility device having at least two wheels;
a distance measuring device configured to be removably attached to a frame of the mobility device and configured to monitor a geographic location of the mobility device,
wherein the distance measuring device comprises at least a sensing mechanism, a measuring mechanism, a mechanism configured to determine a geographic location of a user, and a display in operable communication with one another, with the sensing mechanism configured to monitor the geographic location of the mobility device;
wherein the geographic location of the mobility device is sent to a third party to allow the third party to determine the geographic location of the mobility device.

2. The system of claim 1, wherein the mobility device is a walker or a wheelchair.

3. The system of claim 1, wherein the mechanism configured to determine the location of the user is a GPS-enabled mechanism.

4. The system of claim 1, wherein the distance measuring device further includes at least one button configured to send an alarm message to one or more secondary devices.

5. The system of claim 1, wherein the distance measuring device further includes one or more wireless communication devices configured to wirelessly send data to one or more secondary devices.

6. The system of claim 1 wherein the distance measuring device further comprises a processor and a memory.

7. A distance measuring device configured to be removably attached to a frame of a mobility device, the distance measuring device comprising:
a sensing mechanism, a measuring mechanism, a mechanism configured to determine a geographic location of a user, and a display that are all in communication with one another,
wherein the sensing mechanism is configured to monitor the geographic location of the mobility device, and
wherein the geographic location of the mobility device is sent to a third party to allow the third party to determine the geographic location of the mobility device.

8. The device of claim 7, wherein the distance measuring device further includes at least one button configured to send an alarm message to one or more secondary devices.

9. The device of claim 7 wherein the mobility device is a walker or a wheel chair.

10. The device of claim 7 further comprising a processor and a memory.

11. A method to monitor a geographic location of a user utilizing a mobility assistance device:
determining a geographic location of a user through a GPS enabled device, wherein the GPS enabled device is coupled to the mobility assistance device, and wherein the mobility assistance device includes a walker or a wheelchair;
detecting the user request an alarm by engaging an alarm button coupled to the mobility assistance device; and
sending the alarm to a third party along with the geographic location of the user.

12. The device of claim 11, wherein the GPS enabled mechanism is positioned on the frame of the mobility assistance device.

13. The device of claim 11, wherein the geographic location of the user is sent to a third party to allow the third party to determine the geographic location of the user.

* * * * *